July 23, 1940. J. TJAARDA 2,208,710
ELECTRIC MOTOR VEHICLE
Filed June 13, 1938 2 Sheets-Sheet 2
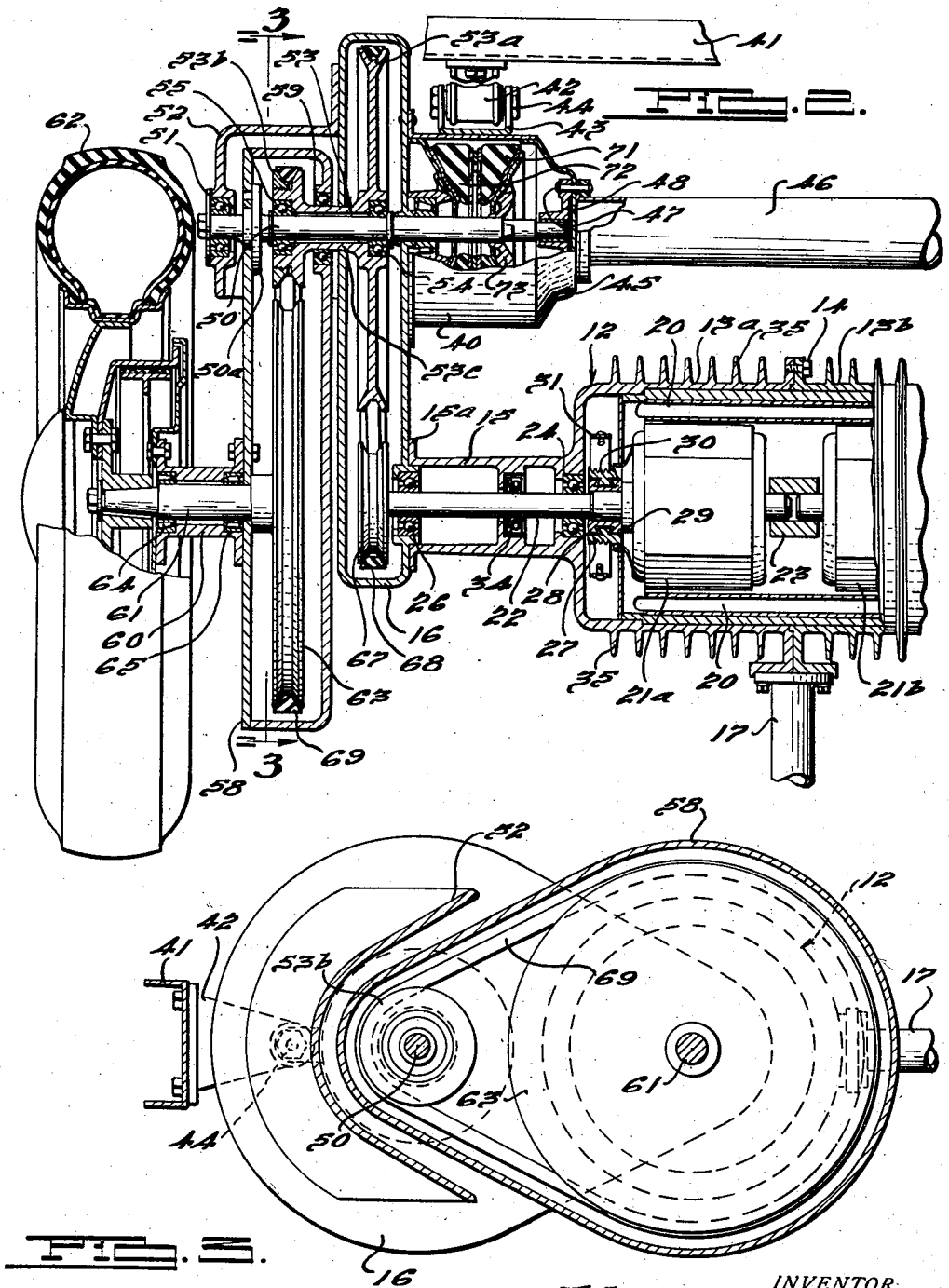
INVENTOR
John Tjaarda.
BY
Dike Calver & Gray
ATTORNEYS Patented July 23, 1940

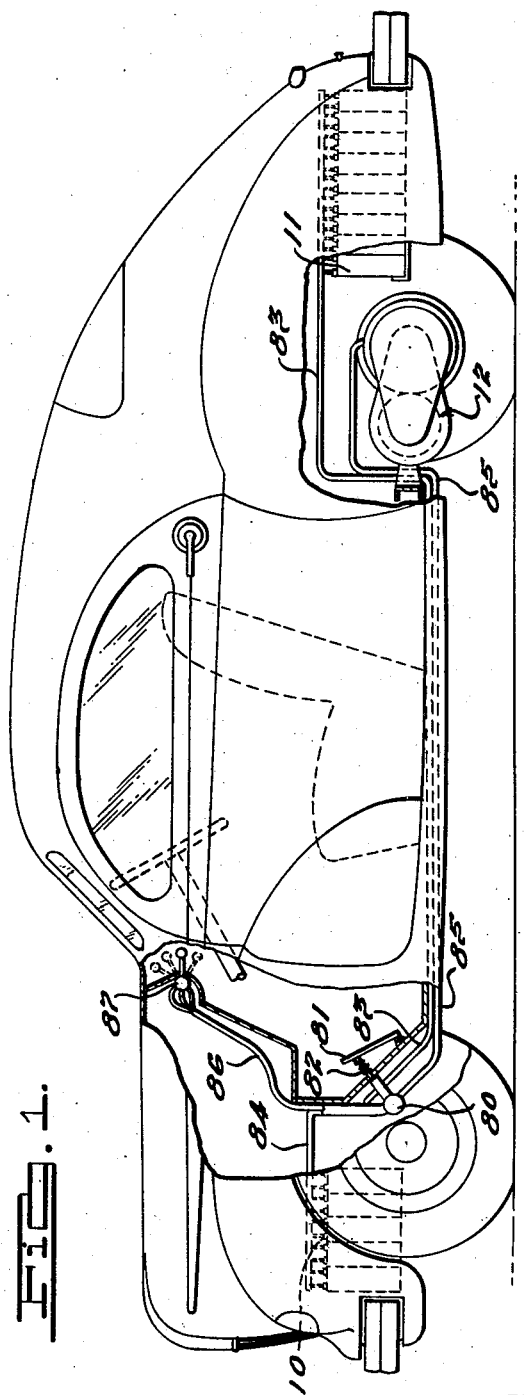

2,208,710

UNITED STATES PATENT OFFICE 2,208,710

ELECTRIC MOTOR VEHICLE

John Tjaarda, Birmingham, Mich., assignor to Briggs Manufacturing Company, Detroit, Mich., a corporation of Michigan Application June 13, 1938, Serial No. 213,393

9 Claims. (Cl. 180—65)

This invention relates to motor vehicles and more particularly to motor vehicles of the electric motor driven type.

One of the objects of the present invention is to provide an improved electric motor vehicle which can be started instantly even in the coldest weather and driven away without any preliminary heating up of its power plant.

Another object of the invention is to provide an improved motor vehicle which has no complicated mechanisms, such as a transmission or a differential, and which is controlled simply and easily.

A further object of the invention is to provide a motor vehicle in which universal joints and the difficulties resulting from their use are entirely eliminated.

A still further object of the invention is to provide a motor vehicle in which the propeller shaft and the disadvantages following from its presence in a vehicle are eliminated.

A still further object of the invention is to provide an improved motor vehicle in which the disadvantages incidental to the operation of the gasoline engine, such as objectionable odors, possibility of carbon monoxide poisoning, vibrations and the like, are eliminated.

A still further object of the invention is to provide an improved motor vehicle having a power plant capable of developing a sufficiently high starting torque on the driving wheels without the aid of a torque increasing device, such as a transmission.

A still further object of the invention is to provide an improved electric motor vehicle operated from a storage battery, means being provided whereby the loads on the battery are distributed successively on all cells thereof, causing substantially uniform discharging of all of the cells.

A still further object of the invention is to provide an electric motor vehicle having an improved suspension of the driving wheels.

A still further object of the invention is to provide an improved electric motor vehicle in which the electric motors are mounted on the sprung structure of the vehicle, whereby serious disadvantages resulting from mounting heavy electric motors directly on the axles are eliminated.

It is an added object of the present invention to provide an improved electric motor vehicle of the foregoing character, which is simple in construction, dependable in operation, is relatively inexpensive to manufacture and is easy to service and repair.

Other objects of this invention will appear in the following description and appended claims, reference being had to the accompanying drawings forming a part of this specification wherein like reference characters designate corresponding parts in the several views.

Fig. 1 is a side view, partly in section, of a motor vehicle embodying the present invention.

Fig. 2 is a top view, partly in section, of the right hand portion of the driving axle, illustrating the wheel suspension and the power transmission means.

Fig. 3 is a side view taken in the direction of the arrows on the vertical plane passing through the line 3—3 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a vehicle constructed in accordance with one embodiment of the present invention. The vehicle is provided with a source of electric energy, in the present instance a storage battery, divided into two sections and an electric power plant arranged at the rear of the vehicle and operatively connected to the rear axle for driving the same. The vehicle body and its front or steering axle are of substantially conventional types as used in connection with motor vehicles. It will be understood, however, that other types of vehicle bodies and other arrangements of the axles, such for instance as providing the driving axle at the front of the vehicle, may be employed and advantageously used in connection with the present invention. Sources of electric energy other than storage batteries as well as other arrangements of the sections of batteries may also be used.

Referring to the drawings, and particularly to Fig. 1, the motor vehicle shown therein resembles in its appearance a conventional motor vehicle. The sections of the storage battery 10 and 11 are arranged under the hood of the vehicle and at the rear thereof, respectively, as shown. With the present type of vehicle, the rear section 11 of the battery is larger than the front section 10, which arrangement causes the larger weight to be carried by the driving axle, thereby increasing the traction of the wheels on the road.

The electric motor used in the present embodiment is indicated generally by the numeral 12. The motor comprises an oil tight casing consisting of two symmetrical sections 13a and 13b connected in the middle with the aid of screws 14, the extremities of said sections being provided with shaft housing tubes 15 having flanges 15a by which the casing sections are secured to the pulley housing 16. The pulley housing 16 is secured, in a manner described in detail later, to the sprung structure of the vehicle. By virtue of being secured to said housing 16 and by the provision of the tube 17 connecting the housing sections 13a and 13b to the middle of the sprung structure of the vehicle, the electric motor 12 is mounted on the sprung structure of the vehicle, which feature is a distinct advantage since it is always desirable to reduce the unsprung weight of a vehicle to a possible minimum. In prior structures heavy electric motors have been mounted directly on the driving axle and therefore they increase considerably the unsprung weight of the vehicle.

Within the motor casing formed by the sections 13a and 13b there is provided a single electromagnetic field 20 extending substantially throughout the entire length of said sections. Within the magnetic flux created by said field, there are adapted to rotate therein two armatures 21a and 21b. Said armatures are entirely separate from each other as far as their operation is concerned with the exception of the fact that they rotate within a single electromagnetic field 20. For the sake of simplicity and considering the fact that said armatures are substantially identical in their constructions only one of said armatures, namely the one indicated by the numeral 21a, will be described in detail with reference numerals applied to the parts thereof.

The armature 21a is mounted on an armature shaft 22 which is journaled in the pilot bearing 23 common to both armatures 21a and 21b, the roller bearing 24 arranged in the tubular extension 15, and the ball bearing 26 arranged in the housing 16. Thus, the armature shaft 22 is supported at three points, which construction ensures quiet running of the armature and prevents excessive bending of the shaft 22.

The commutator employed in the present embodiment of the invention is of an articulated type, and it includes a plurality of copper segments 27 retained between the steel shell 28 and the retainer ring 29. The contact surfaces of the segments 27 are provided with a plurality of angular grooves 30 which cooperate with correspondingly shaped brushes 31. The provision of grooved contact surfaces on the commutator increases the area of the contact surfaces between the brushes and the commutator segments, which results in a more compact design permitting a shorter armature shaft less liable to bend under loads, decreases the voltage loss between the brushes and the commutator segments, eliminates chattering and squealing of brushes at the lower speeds and finally prevents side play of brushes on the commutator, thereby preventing excessive wear thereof. By virtue of such a construction it is also possible to use aluminum bronze as the commutator material, allowing the armature winding and the commutator to be die cast as one unit, if desired.

An oil seal 34 is provided around the shaft 22 in the tubular extension 15 to prevent leakage of the oil around the shaft. The casing 12 being oil tight as mentioned is adapted to hold a quantity of oil therein and therefore the armatures rotate in a bath of insulating and cooling oil. Fins 35 are provided on the outside surface of the casing 12 in order to increase the cooling surface thereof which prevents excessive heating of the motor.

In the present embodiment of the invention, a direct current motor is employed having a six pull series split field. The armature is provided with a number of slots, preferably from 43 to 63, and is wave retrogressive wound.

As mentioned, the motor has a double armature rotating in a single field. By virtue of such a construction a proper differential action is attained without the use of a conventional differential mechanism. It will be understood, however, that two completely independent vehicle motors with one driven axle or two independent motors if a four wheel drive is desired may be used as an alternative. Similarly, a motor having a rotating field connected to one of the driving wheels, and a rotating armature connected to another driving wheel, said field and armature constituting one motor, may be used with a differential.

To the opposite end of the casing 16 there is secured a drum 40 housing a spring device described in detail later, which drum is secured to the body cross member 41 by means of two brackets 42 and 43 connected by means of a pin bolt 44, a resilient bushing being provided between said bolt and bracket 42. The drum 40 is provided with an end cover 45 which is connected to the flanges of a tubular member 46 connected in the same manner to a similar drum on the other side of the vehicle. Rivets 47 connecting the flanges of the tube 46 to the cover 45 also connect to said cover a hub 48 which is provided with a pilot bearing for an axle shaft 50, the opposite end whereof being journalled in a ball bearing 51 provided in a bracket housing 52 secured to the pulley housing 16.

On the axle shaft 50 there is rotatably mounted a crown pulley 53 consisting of a large pulley 53a and an articulated small pulley 53b connected by means of a portion 53c integrally formed with the pulleys. In order to eliminate friction, ball bearings 54 and 55 are provided between the crown pulley 53 and the axle shaft 50.

A swinging housing or hollow arm 58 is secured to a flange 50a of the shaft 50, said hollow arm being adapted to rotate with said shaft. In order to permit free rotation of said arm independently and without interference with the crown pulley 53, a ball bearing 59 is provided between them. To the opposite side of the swinging arm 58 there is secured a flanged sleeve or bushing 60 carrying a spindle 61 on one end of which is mounted, in a way well known in the art, a driving wheel 62 while on the opposite end of said spindle 60 there is provided a pulley 63. Tapered roller bearings 64 and 65 serve to support the spindle 61 in the bushing 60.

A small pulley 67 is provided on the end of the armature shaft 22 and is drivingly connected with the large pulley 53a by means of a V-belt 68, while the articulated pulley 53b is connected with the pulley 63 by means of a second V-belt 69.

By virtue of such a construction, the motor 12 is drivingly connected with the driving wheel 62, the power being transmitted from the pulley 67 through the belt 68 to the pulley 53a integral with the pulley 53b and therefore rotating at the same speed therewith; from the pulley 53b the power is transmitted through the belt 69 to the pulley 63 mounted on the same shaft or spindle with the driving wheel 62. Since in the above described double train of pulleys the power is transmitted from a smaller to a larger pulley in both instances, a considerable reduction in rotative speed of the shafts and increase in the torque is attained. In other words, because of the two stage or step power transmission, the driving wheel rotates at a much lower speed than the armature of the electric motor, but it develops a correspondingly larger torque or rotating effect. From an examination of the drawings, particularly of Figs. 2 and 3, it will be understood that vertical movements of the wheel 62 caused by the roughness of the road do not interfere with the transmission of power from the electric motor to the driving wheel, since as the wheel 62 moves upward, the swinging hollow arm or housing 58 rotates with the shaft 50 independently of the crown pulley 53, said shaft 50 being supported in the bearings carried by the sprung structure of the vehicle. Thus, the only unsprung weight in the wheel suspension is represented by the wheel 62, the pulley 63 and the swinging arm 58.

In order to effect resiliency of the suspension of the wheel 62, a spring device is provided, the same being housed in the drum 40 and adapted to resist resiliently the rotation of the axle shaft 50 produced by the vertical movements of the driving wheel 62. Said spring device is described in detail in a copending application, Serial No. 195,473, filed March 12, 1938. For this reason a detailed description of said spring device is omitted herein, the following brief description being sufficient for the purpose of understanding the construction of said spring device. The device comprises a plurality, in the present instance two, of rubber washers or annular rubber members 71 and 72 of converging cross sections, having adjacent bonded metallic faces drivingly connected together through releasable coupling devices. The rubber members are bonded at both ends to metal plates, one of said metal plates being anchored on the stationary drum 40, while the other is secured for rotation with the aid of a spider 73 to the axle shaft 50. The rubber members 71 and 72 are retained under substantial initial compression in an axial direction and rotation of the shaft 50 produces distortion of the rubber washers, which distortion said washers resiliently resist.

The electrical connection of the sections 10 and 11 of the storage battery with the electric motor includes a control device 80 provided within a convenient reach of the operator's foot. The device 80 is operated with the aid of a foot pedal 81 hingedly connected to the bar 82 actuating the device. All of the cells of the sections 10 and 11 are connected by means of separate conductors to the control device 80, said conductors being gathered into two cables 83 and 84, while the control device 80 is connected with the electric motor 12 by means of a two-conductor cable 85. A three-conductor cable 86 connects a switch 87 provided on the instrument panel of the vehicle with the control device, said switch permitting breaking the motor circuit for stopping the vehicle, closing the circuit for starting the same, and reversing the direction of the current through the circuit, thereby reversing the direction of rotation of the motor for backward movement of the vehicle.

The electrical control device provided in accordance with the present invention is adapted to establish and maintain electrical connections between a desired number of the battery cells and the electric motor. In the present embodiment the control device is so arranged that as the foot pedal 81 is pressed down further and further, a gradually increasing number of battery cells become connected to the electric motor 12. With the foot pedal pressed all the way down, all the cells are connected to the electric motor and the same delivers its maximum power.

I claim:

1. In a motor vehicle having a sprung structure, an electric motor secured to the sprung structure, a swinging hollow arm pivoted by one of its ends on the sprung structure, a driving wheel carried on the other end of said arm, and means drivingly connecting said wheel with said electric motor, said means including a two stage pulley-and-belt connection disposed partly within said arm.

2. In a motor vehicle having a sprung structure, an electric motor secured to the sprung structure, an axle shaft rotatively mounted on the sprung structure, a swinging arm having an end secured to said shaft, a driving wheel carried on the other end of said arm, whereby bodily movements of the wheel cause rotation of the axle shaft, means resiliently resisting rotation of said axle shaft, and two stage means of the belt type drivingly connecting said electric motor and said driving wheel.

3. In a motor vehicle having a sprung structure, an electric motor secured to the sprung structure, an axle shaft rotatively mounted on the sprung structure, a swinging arm having an end secured to said shaft, a driving wheel carried on the other end of said arm, whereby bodily movements of the wheel cause rotation of the axle shaft, means resiliently resisting rotation of said axle shaft, and means including two V-belts drivingly connecting said electric motor and said driving wheel.

4. In a motor vehicle having a sprung structure, an electric motor secured to the sprung structure, an axle shaft rotatively mounted on the sprung structure, a hollow swinging arm having an end secured to said shaft, a driving wheel carried on the other end of said arm, whereby bodily movements of the wheel cause rotation of the axle shaft, means resiliently resisting rotation of said axle shaft, and means drivingly connecting said electric motor and said driving wheel, said means including a flexible connector disposed within said hollow arm.

5. In a motor vehicle having a sprung structure, an electric motor secured to said structure, an axle shaft rotatively mounted on said sprung structure, a swinging arm having one of its ends secured to said shaft, a driving wheel carried on the opposite end of said arm, whereby bodily movements of the wheel cause rotation of said shaft, resilient means opposing rotation of said shaft, mechanical means transmitting power from said motor to said wheel, said means including a combined driven-and-driving element rotatively mounted on said axle shaft.

6. In a motor vehicle having a sprung structure, an electric motor secured to said structure, an axle shaft rotatively mounted on said sprung structure, a swinging arm having one of its ends secured to said shaft, a driving wheel carried on the opposite end of said arm, whereby bodily movements of the wheel cause rotation of said shaft, resilient means opposing rotation of said shaft, means transmitting power from said motor to said wheel, said means including a driving element on said motor, a combined driven-and-driving element mounted on said shaft and adapted to rotate independently therefrom, and a driven element on said driving wheel, said elements forming a power transmitting train.

7. In a motor vehicle having a sprung structure, an electric motor secured to said structure, an axle shaft rotatively mounted on said sprung structure, a swinging arm having one of its ends secured to said shaft, a driving wheel carried on the opposite end of said arm, whereby bodily movements of the wheel cause rotation of said shaft, resilient means opposing rotation of said shaft, means transmitting power from said motor to said wheel, said means including a driving element on said motor, a combined driven-and-driving element mounted on said shaft and adapted to rotate independently therefrom, a driven element on said driving wheel, and flexible connectors drivingly connecting said elements.

8. In a motor vehicle having a sprung structure, an electric motor secured to said structure, an axle shaft rotatively mounted on said sprung structure, a swinging arm having one of its ends secured to said shaft, a driving wheel carried on the opposite end of said arm, whereby bodily movements of the wheel cause rotation of said shaft, resilient means opposing rotation of said shaft, a driving pulley on said motor, a driven pulley on said driving wheel, a double-step pulley mounted on said axle shaft and adapted to rotate independently thereof, a belt connection between said driving pulley and said double-step pulley, and a belt connection between said double-step pulley and said driven pulley.

9. In a motor vehicle having a sprung structure, an electric motor secured to said structure and having an armature shaft, an axle shaft rotatively mounted on said sprung structure, a hollow swinging arm having one of its ends secured to said axle shaft, a spindle rotatively mounted in the other end of said arm, a driving wheel secured to said spindle, means including a plurality of annular rubber members adapted to resist resiliently rotation of said axle shaft, a driving pulley on said armature shaft, a driven pulley secured to the end of said spindle and disposed within said hollow arm, a double-step pulley mounted on said axle shaft, partly within said hollow arm, and adapted to rotate independently of said shaft and arm, and two belts drivingly connecting said double-step pulley with said driving and said driven pulley.

JOHN TJAARDA.